UNITED STATES PATENT OFFICE.

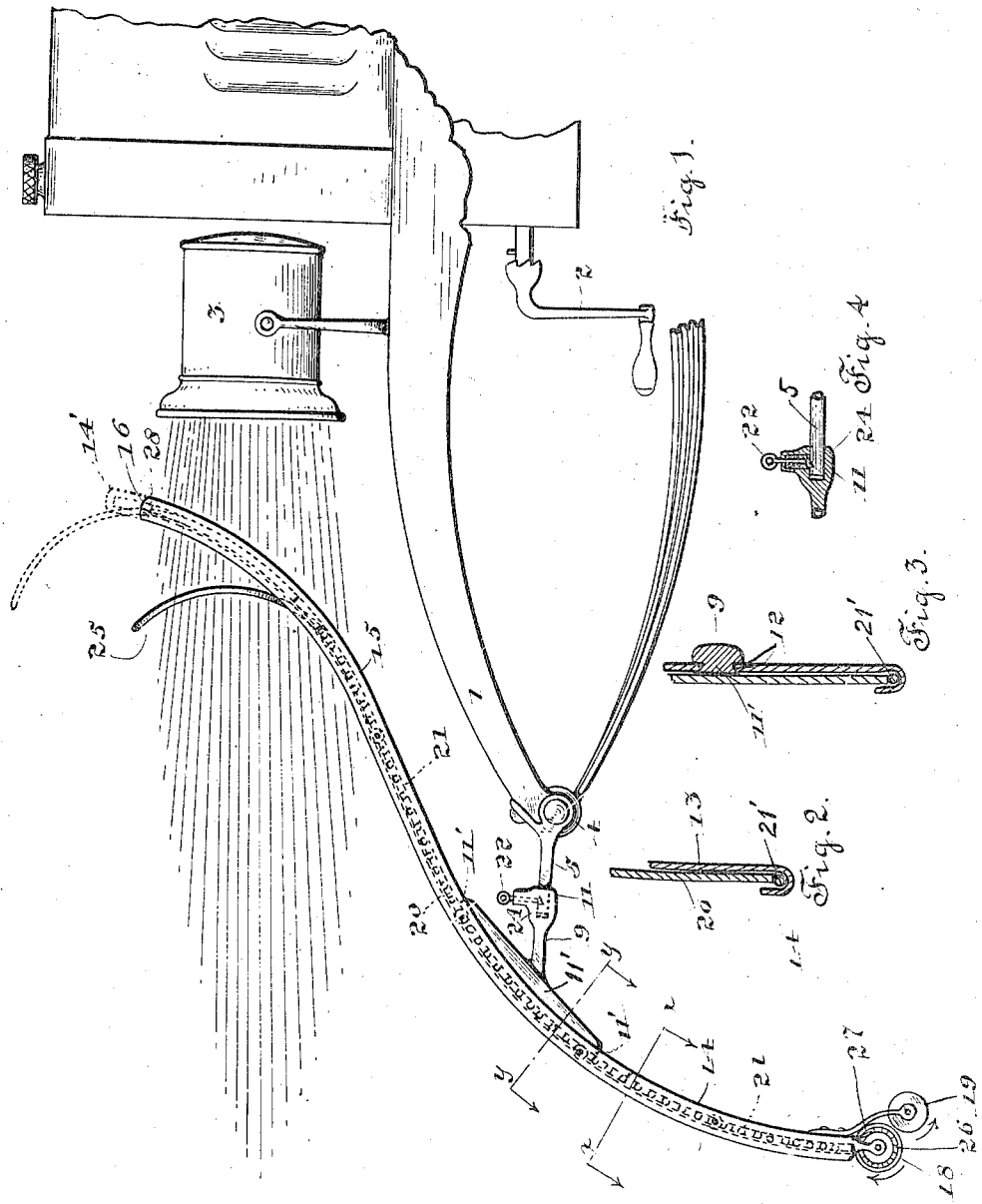

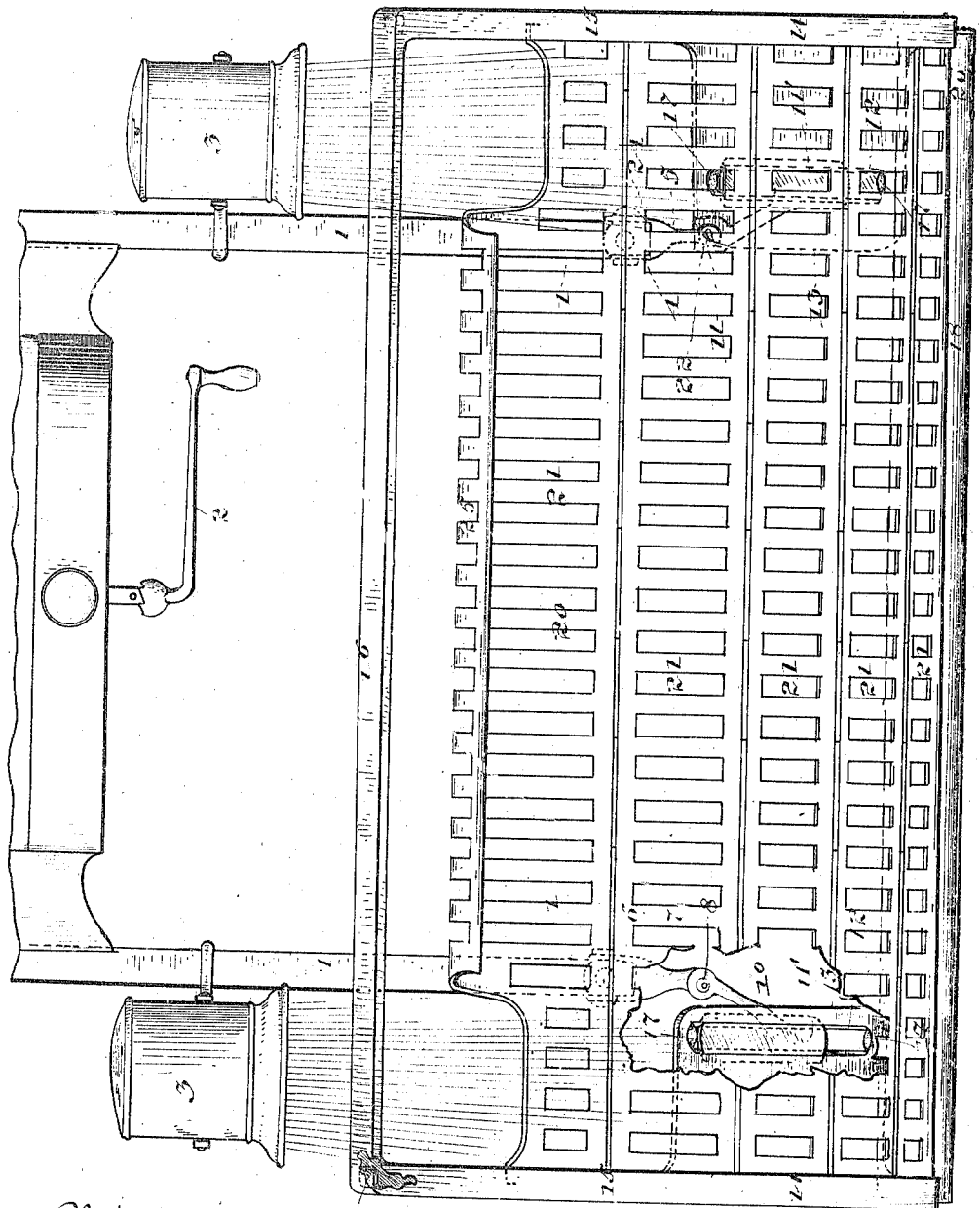

JAMES E. BENNETT, OF CHICAGO, ILLINOIS.

AUTOMOBILE-FENDER.

951,588.  Specification of Letters Patent.  Patented Mar. 8, 1910.

Application filed November 1, 1909. Serial No. 525,715.

*To all whom it may concern:*

Be it known that I, JAMES E. BENNETT, a citizen of the United States, residing at Chicago, county of Cook, and State of Illinois, have invented certain new and useful Improvements in Automobile-Fenders, of which the following is a specification.

My invention relates to improvements in automobile fenders, the object of the invention being to provide a fender which is simple in construction, quick and effective in use and at all times in the proper position to catch and hold a person struck by it.

A further object is to so construct the fender that the lower edge thereof may at all times be in close proximity to the surface of the road-bed, thus obviating the danger of persons being caught between the fender and the road surface. And a further object is to provide means on the fender so arranged and mounted as to catch the person and to cushion the shock thus preventing injury even when the automobile is traveling at a high speed.

With these objects in view my invention consists in the novel construction and arrangement of parts which will be hereinafter fully described and more particularly pointed out in the appended claims.

My invention will be best understood by reference to the accompanying drawings forming a part of this specification, and in which, Figure 1 is a side elevation of my improved automobile fender in its preferred form, Fig. 2 is a transverse section taken on line $x$—$x$ of Fig. 1, Fig. 3 is a transverse section taken on line $y$—$y$ of Fig. 1, Fig. 4 is a detail view showing a snap-lock used in the connection of the fender with the automobile frame, and Fig. 5 is a top plan view.

Referring now to the drawings 1 designates the front portion of an automobile frame, 2 the starting crank, and 3 the lamps. Secured to one nose 4 of the frame 1 is a forwardly extending cylindrical arm 5 and secured to the other nose 6 is a similar arm 7 except that the forward extremity thereof constitutes a part of the hinge joint 8. The fender supports 9 and 10 are similar except that the former is connected to the arm 5 by means of a snap-lock 11 and the latter is hinged to the arm 7 as shown in Fig. 5. The forward portion of each support is inclined to the rearward portion thereof and in its face a dove-tailed guide tongue 11' is provided which fits snugly in the dove-tailed slot 12 provided in the corresponding lateral end of the inwardly extending supporting member 13 of the fender frame 14. The latter is preferably of channeled steel and is substantially U-shaped in form having side members 15 and a transverse top member 16, the supporting members 13 being extensions of the lower flanges of the members 15. Each end of the slots 12 is provided with a rubber bumper 17 to prevent shocks when the tongues 11' move quickly in said slots.

Journaled in the lower ends of the frame 14 is a ratchet-controlled roller 18, and connected with said ends is a roller 19 adapted to run freely and to support the fender should it strike the road-bed, the object of the slots 12 being to allow a limited upward movement of the frame 14 to relieve the roller 19 should it contact with an unusual obstruction. Dotted lines 14' indicate this upward movement. Gravity causes the frame 14 to remain in the normal position as shown in Figs. 1 and 5, in which case each tongue 11' would be in contact with the bumpers 17 at the upper ends of the slots 12. A flexible carrier 20 composed of transversely extending foraminated leaves 21 hinged together is slidably mounted in the frame 14, the object of this leaf construction being to permit the carrier to conform to the compound curve of said frame. To prevent undue friction and binding a series of balls 21' are inserted between the ends of the leaves 21 and the inner curved surface of the channeled frame 14 which forms a race for said balls.

The hinge joint 8 allows the fender to swing in a horizontal plane when the spring-pressed 22 of the snap-lock 11 is pulled upwardly, thus providing access to the starting crank 2 of the machine. The lower end of the spring-pressed pin 22 is beveled and adapted to catch and lock automatically in a similarly beveled recess formed in the arm 5 when the sleeve 24 of the support 9 is pressed thereover. To unlock the device the spring-pressed pin 22 is pulled upwardly as aforesaid.

In case a person is struck by the fender the carrier thereof will travel upwardly and rearwardly in the frame 14 to the position as indicated by dotted lines, the curved leaf 25 of the carrier serving as a cradle for catching the person and protecting the latter from injury. It is apparent that the upward and rearward movement of the carrier cushions the shock, since the impact in a horizontal plane is resolved into substantially vertical movement.

It will be observed that since the roller 18 can rotate in one direction only, the same being controlled by the ratchet and pawl 26 and 27 respectively, a certain amount of frictional resistance is exerted in preventing persons contacting therewith from being caught under the fender, this roller rather tending to elevate a person struck by it. Bumpers 28 are provided to lessen the shock when the carrier stops in its rearward movement.

While I have shown what I deem to be the preferable form of my invention I do not wish to be limited thereto as there might be various changes made in the details of construction and arrangement of parts described without departing from my invention, and hence I desire to avail myself of such changes and alterations as fairly fall within the spirit and scope of the appended claims.

Having described my invention what I claim as new and desire to secure by Letters Patent is:

1. In a device of the class described, a normally stationary frame, a carrier slidably mounted on said frame, an automobile frame, and two connections between said first named frame and said automobile frame, one of which is fixed and the other detachable, substantially as described.

2. A device of the class described comprising a frame, a carrier mounted in said frame and adapted to slide therein forwardly and rearwardly, an automobile frame, a hinged connection between said first named frame and one nose of said automobile frame and a detachable connection between said first named frame and the other nose, and transversely disposed rollers mounted adjacent the lower edge of said carrier, one of the latter being ratchet-controlled, substantially as described.

3. In a device of the class described, a compound curved channel frame, and automobile frame, arms extending forwardly from said automobile frame and secured thereto, a support hinged to one of said arms and a support detachably secured to the other, said supports being secured to said first named frame and adapted to move slightly relative thereto, and a flexible carrier slidably mounted in said first named frame, substantially as described.

4. In a device of the class described, a compound curved channel frame, an automobile frame, arms extending forwardly from said automobile frame and secured thereto, a support hinged to one of said arms and a support detachably secured to the other, said supports being secured to said first named frame and adapted to move relative thereto, and a flexible carrier slidably mounted in said first named frame, the latter being composed of transversely extending foraminated leaves hinged together, substantially as described.

5. In a device of the class described, a compound curved frame, an automobile frame, arms extending forwardly from said automobile frame and secured thereto, a support hinged to one of said arms and a support detachably secured to the other, said supports being secured to said first named frame and adapted to move slightly relative thereto, and a flexible carrier mounted in said first named frame, the latter being composed of transversely extending leaves hinged together the uppermost of which is curved and projected above said first-named frame, substantially as described.

6. In a device of the class described, a compound curved channel frame, an automobile frame, arms extending forwardly from said automobile frame and secured thereto, a support hinged to one of said arms and a support detachably secured to the other, said supports being in engagement with said first named frame and adapted to move slightly relative thereto, and a flexible carrier slidably mounted in said first named frame, the connection of said supports with said first named frame comprising slots provided in inwardly extending portions of the latter to receive the forward extremities of said supports, substantially as described.

In testimony whereof I have signed my name to this specification in the presence of two subscribing witnesses.

JAMES E. BENNETT.

Witnesses:
 HELEN F. LILLIS,
 JOSHUA R. H. POTTS.